United States Patent
Beal et al.

(10) Patent No.: US 6,634,506 B2
(45) Date of Patent: Oct. 21, 2003

(54) REUSABLE CONTAINER MANAGEMENT SYSTEM AND METHOD

(75) Inventors: Michael S. Beal, Austin, TX (US); Stephen W. Roth, Austin, TX (US); David G. Foral, Austin, TX (US)

(73) Assignee: Dell Products L.P., Round Rock, TX (US)

(*) Notice: Subject to any disclaimer, the term of this patent is extended or adjusted under 35 U.S.C. 154(b) by 150 days.

(21) Appl. No.: 09/800,043

(22) Filed: Mar. 5, 2001

(65) Prior Publication Data

US 2002/0121521 A1 Sep. 5, 2002

(51) Int. Cl.[7] .................................................. B07C 5/00
(52) U.S. Cl. ........................ 209/630; 209/702; 206/725
(58) Field of Search ................................. 209/630, 702, 209/706; 206/722, 725

(56) References Cited

U.S. PATENT DOCUMENTS

| | | | |
|---|---|---|---|
| 3,792,785 A | 2/1974 | Weir ..................... | 214/16.4 A |
| 3,796,327 A | 3/1974 | Meyer et al. ........... | 214/38 BB |
| 4,310,276 A | * 1/1982 | Castagnoli .............. | 209/912 X |
| 4,336,589 A | 6/1982 | Smith et al. ................. | 364/403 |
| 4,473,935 A | 10/1984 | Tatsuura et al. .............. | 29/429 |
| 4,501,528 A | 2/1985 | Knapp ....................... | 414/273 |
| 4,509,123 A | 4/1985 | Vereen ....................... | 364/300 |
| 4,544,318 A | 10/1985 | Nagatomo et al. ........... | 414/222 |
| 4,566,595 A | 1/1986 | Fustier ....................... | 209/545 |
| 4,669,047 A | 5/1987 | Chucta ....................... | 364/468 |
| 4,692,876 A | 9/1987 | Tenma et al. ................. | 364/513 |
| 4,703,558 A | 11/1987 | Makinen ...................... | 29/784 |
| 4,711,016 A | 12/1987 | Genschow et al. ........... | 29/568 |
| 4,722,653 A | 2/1988 | Williams et al. ............. | 414/222 |
| 4,738,387 A | 4/1988 | Jaufmann et al. ............ | 228/4.1 |
| 4,798,290 A | 1/1989 | Bradford .................... | 206/328 |
| 4,815,190 A | 3/1989 | Haba, Jr. et al. .............. | 29/430 |

(List continued on next page.)

FOREIGN PATENT DOCUMENTS

| | | | |
|---|---|---|---|
| EP | 0 308 248 | 9/1988 | ........... B62D/65/00 |
| EP | 0 606 515 A2 | 3/1993 | ........... B23Q/7/14 |
| EP | 0 606 515 | 3/1993 | ........... B23Q/7/14 |
| JP | 61094930 | 5/1986 | ........... B65G/61/00 |
| JP | 61155128 | 7/1986 | ........... B65G/63/00 |
| JP | 3005894 | 1/1991 | ........... G07B/15/00 |
| JP | 6013449 | 1/1994 | ........... H01L/21/68 |
| JP | 6345269 | 12/1994 | ........... B65G/57/03 |
| JP | 7110834 | 4/1995 | ........... G06F/19/00 |
| JP | 8147568 | 6/1996 | ........... G07G/1/12 |
| JP | 8295409 | 11/1996 | ........... B65G/1/137 |
| JP | 11306233 | 11/1999 | ........... G06F/17/60 |
| JP | 11310312 | 11/1999 | ........... B65G/1/137 |

OTHER PUBLICATIONS

U.S. patent application Ser. No. 09/426,932 entitled *Dynamic Virtual Local Area Network Connection Process*, Filed Oct. 22, 1999.

U.S. patent application Ser. No. 09/426,232 entitled *Site–to–Site Dynamic Virtual Local Area Network*, Filed Oct. 22, 1999.

(List continued on next page.)

*Primary Examiner*—Tuan N. Nguyen
(74) *Attorney, Agent, or Firm*—Baker Botts L.L.P.

(57) ABSTRACT

The present disclosure includes a management system using multiple reusable containers. The reusable containers are box structures that include materials and components that protect its contents from electrostatic discharge and at least two identifiers affixed to the reusable container. The ESD-protective components enable the safe handling of the full container inside of a manufacturing facility. The first identifier indicates an associated materials storage facility; the second identifier indicates an associated supplier. A third identifier may also be included that indicates an associated divider disposed within the reusable container. The first identifier, second identifier, and third identifier facilitate a two stage return process after the reusable container has been emptied of its contents.

8 Claims, 4 Drawing Sheets

U.S. PATENT DOCUMENTS

| | | | | |
|---|---|---|---|---|
| 4,821,197 | A | 4/1989 | Kenik et al. | 364/468 |
| 4,823,233 | A | 4/1989 | Brown et al. | 361/383 |
| 4,866,628 | A | 9/1989 | Natarajan | 364/468 |
| 4,894,908 | A | 1/1990 | Haba, Jr. et al. | 29/711 |
| 4,966,280 | A | 10/1990 | Bradford | 206/328 |
| 5,017,260 | A | 5/1991 | Bardford | 156/308.2 |
| 5,019,963 | A | 5/1991 | Alderson et al. | 364/200 |
| 5,037,027 | A | 8/1991 | Nichols | 229/198.1 |
| 5,038,283 | A | 8/1991 | Caveney | 235/385 |
| 5,099,431 | A | 3/1992 | Natarajan | 364/468 |
| 5,131,212 | A | 7/1992 | Grey et al. | 53/472 |
| 5,144,532 | A | 9/1992 | Wessely et al. | 361/385 |
| 5,146,732 | A | 9/1992 | Grey et al. | 53/472 |
| 5,155,847 | A | 10/1992 | Kirouac et al. | 395/600 |
| 5,193,065 | A | 3/1993 | Guerindon et al. | 364/468 |
| 5,205,406 | A | 4/1993 | Bradford | 206/328 |
| 5,216,613 | A | 6/1993 | Head, III | 369/275.2 |
| 5,218,510 | A | 6/1993 | Bradford | 361/220 |
| 5,229,948 | A | 7/1993 | Wei et al. | 364/468 |
| 5,247,683 | A | 9/1993 | Holmes et al. | 395/700 |
| 5,247,747 | A | 9/1993 | Grey et al. | 53/472 |
| 5,255,181 | A | 10/1993 | Chapman et al. | 364/401 |
| 5,262,954 | A | 11/1993 | Fujino et al. | 364/468 |
| 5,271,703 | A | 12/1993 | Lindqvist et al. | 414/268 |
| 5,321,605 | A | 6/1994 | Chapman et al. | 364/402 |
| 5,327,354 | A | 7/1994 | Tsujimoto | 364/478 |
| 5,344,024 | A * | 9/1994 | Cohu | 220/526 X |
| 5,353,243 | A | 10/1994 | Read et al. | 364/578 |
| 5,367,624 | A | 11/1994 | Cooper | 395/157 |
| 5,371,679 | A | 12/1994 | Abe et al. | 364/468 |
| 5,386,621 | A | 2/1995 | Fluegge et al. | 29/705 |
| 5,411,151 | A | 5/1995 | Sasada | 209/583 |
| 5,450,317 | A | 9/1995 | Lu et al. | 364/402 |
| 5,456,061 | A | 10/1995 | Grey et al. | 53/472 |
| 5,469,691 | A | 11/1995 | Grey et al. | 53/472 |
| 5,485,369 | A | 1/1996 | Nicholls et al. | 364/401 |
| 5,513,427 | A | 5/1996 | Yokoyama et al. | 29/701 |
| 5,522,539 | A | 6/1996 | Bazany | 229/199 |
| 5,540,536 | A | 7/1996 | Hoedl | 414/417 |
| 5,542,237 | A | 8/1996 | Grey et al. | 53/472 |
| 5,579,231 | A | 11/1996 | Sudou et al. | 364/468.01 |
| 5,586,021 | A | 12/1996 | Fargher et al. | 364/468.06 |
| 5,590,794 | A * | 1/1997 | Zachary | 211/10 X |
| 5,593,269 | A | 1/1997 | Bernard, II | 414/331 |
| 5,596,502 | A | 1/1997 | Koski et al. | 364/468.01 |
| 5,597,113 | A | 1/1997 | Bradford | 229/120.36 |
| 5,608,621 | A | 3/1997 | Caveney et al. | 395/216 |
| 5,613,606 | A * | 3/1997 | Meyer | 211/52 X |
| 5,613,610 | A | 3/1997 | Bradford | 206/721 |
| 5,630,070 | A | 5/1997 | Dietrich et al. | 395/208 |
| 5,653,351 | A | 8/1997 | Grout et al. | 212/153 |
| 5,666,493 | A | 9/1997 | Wojcik et al. | 705/26 |
| 5,672,039 | A | 9/1997 | Perry et al. | 414/280 |
| 5,712,989 | A | 1/1998 | Johnson et al. | 395/228 |
| 5,720,157 | A | 2/1998 | Ross | 53/445 |
| 5,758,329 | A | 5/1998 | Wojcik et al. | 705/28 |
| 5,787,283 | A | 7/1998 | Chin et al. | 395/701 |
| 5,822,216 | A | 10/1998 | Satchell, Jr. et al. | 364/479.01 |
| 5,826,238 | A | 10/1998 | Chen et al. | 705/8 |
| 5,867,714 | A | 2/1999 | Todd et al. | 395/712 |
| 5,869,820 | A | 2/1999 | Chen et al. | 235/376 |
| 5,873,449 | A | 2/1999 | Davenport | 198/370.09 |
| 5,894,571 | A | 4/1999 | O'Connor | 395/652 |
| 5,896,292 | A | 4/1999 | Hosaka et al. | 364/468.15 |
| 5,903,457 | A | 5/1999 | Chang | 364/468.01 |
| 5,916,508 | A | 6/1999 | Bradford | 264/263 |
| 5,919,247 | A | 7/1999 | Van Hoff et al. | 709/217 |
| 5,936,860 | A | 8/1999 | Arnold et al. | 364/468.01 |
| 5,937,388 | A | 8/1999 | Davis et al. | 705/8 |
| 5,943,841 | A | 8/1999 | Wünscher | 53/154 |
| 5,963,743 | A | 10/1999 | Amberg et al. | 395/712 |
| 5,971,587 | A | 10/1999 | Kato et al. | 364/468.22 |
| 5,974,547 | A | 10/1999 | Klimenko | 713/2 |
| 5,991,543 | A | 11/1999 | Amberg et al. | 395/712 |
| 5,991,732 | A | 11/1999 | Moslares | 705/8 |
| 5,995,757 | A | 11/1999 | Amberg et al. | 395/712 |
| 6,038,486 | A | 3/2000 | Saitoh et al. | 700/96 |
| 6,039,168 | A | 3/2000 | Head, III | 198/341.07 |
| 6,052,684 | A | 4/2000 | Du | 707/8 |
| 6,076,652 | A | 6/2000 | Head, III | 198/341.07 |
| 6,080,207 | A | 6/2000 | Kroening et al. | 717/11 |
| 6,109,444 | A | 8/2000 | Bagwell et al. | 206/589 |
| 6,128,588 | A | 10/2000 | Chacon | 703/6 |
| 6,139,240 | A | 10/2000 | Ando | 414/267 |
| 6,144,945 | A | 11/2000 | Garg et al. | 705/28 |
| 6,148,291 | A | 11/2000 | Radican | 705/28 |
| 6,170,630 | B1 | 1/2001 | Goss et al. | 193/35 |
| 6,182,275 | B1 | 1/2001 | Beelitz et al. | 717/1 |
| 6,202,070 | B1 | 3/2001 | Nguyen et al. | 707/104 |
| 6,202,824 | B1 | 3/2001 | Goss et al. | 198/346.2 |
| 6,205,473 | B1 | 3/2001 | Thomasson et al. | 709/217 |
| 6,236,901 | B1 | 5/2001 | Goss | 700/95 |
| 6,247,126 | B1 | 6/2001 | Beelitz et al. | 713/1 |
| 6,263,253 | B1 | 7/2001 | Yang et al. | 700/99 |
| 6,308,496 | B1 | 10/2001 | Lee et al. | 53/154 |
| 6,314,337 | B1 | 11/2001 | Marcum | 700/216 |
| 6,377,561 | B1 | 4/2002 | Black et al. | 370/330 |
| 6,397,385 | B1 | 5/2002 | Kravitz | 717/173 |
| 6,442,683 | B1 | 8/2002 | Fleming, III | 713/1 |
| 6,499,115 | B1 | 12/2002 | Wiedeman et al. | 714/30 |

OTHER PUBLICATIONS

U.S. patent application Publication No. US 2001/0027350 dated Oct. 4, 2001 for U.S. patent application Ser. No. 09/817,152 filed Mar. 27, 2001 by Koga et al.

U.S. patent Publication No. US 2002/0156663 dated Oct. 24, 2002 for U.S. patent application Ser. No. 09/903,855 filed Jul. 13, 2001 by David Weber et al.

U.S. patent Publication No. US 2002/0128810 dated Sep. 12, 2002 for U.S. patent application Ser. No. 10/020,277 filed Dec. 18, 2001 by John J. Craig et al.

U.S. patent application Ser. No. 09/333786, filed Jun. 15, 1999.

U.S. patent application Ser. No. 09/413463, filed Oct. 6, 1999.

U.S. patent application Ser. No. 09/378020, filed Aug. 19, 1999.

Tom Feare *Less Automation Means More Productivity at Sun Microsystems* Modern Materials Handling at pp. 39–41, Nov. 1995.

U.S. patent application Ser. No. 09/053,524 entitled "*Build to Order with Continuous Flow Manufacturing*" filed by Goss; Dell USA, Assignee (DC–01484), Filed Mar. 31, 1998.

U.S. patent application Ser. No. 09/484,712 entitled "*Method and Apparatus for Consolidating Manufacturing of Computing Devices*" filed by Brown; Dell USA, Assignee (DC–01949), Filed Jan. 18, 2000.

McHugh Software International, McHugh Software International Makes the "*Glass Pipeline*" *a Reality, New Global Visibility Product is Cornerstone of Supply Chain Command &Control*, at internet <http://www.mchugh.com/In_The_News/Oct19_00.htm>, Oct. 19, 2000.

McHugh Software International, *McHugh's Logistics Execution Solution for High Tech/Electronic Companies* at internet <http://www.mchugh.com/industry/hitech_elec.htm>, printed Jan. 25, 2001.

* cited by examiner

REUSABLE CONTAINER MANAGEMENT SYSTEM AND METHOD

TECHNICAL FIELD

The present disclosure relates generally to manufacturing computer systems and more particularly to a system and method of managing manufacturing inventory using reusable containers.

BACKGROUND

Manufacturing inventory is the inventory available to a manufacturing facility to be used in manufacturing products. Reducing the volume of manufacturing inventory has a number of advantages including reducing operating costs and reducing space requirements for storing manufacturing inventory prior to use. However, reducing manufacturing inventory invites a number of significant problems. Because less manufacturing inventory is on hand there is less time to correct inventory problems. Delays in receiving additional manufacturing inventory can disrupt manufacturing as the available manufacturing inventory is used and not replaced. Accordingly, in order for a manufacturing facility operating with limited manufacturing inventory to be effective, it is critical for the manufacturing inventory to be reliably and predictably replenished for the manufacturing facility to operate efficiently.

In the manufacture of computers, the manufacturing inventory includes components such as motherboards, processors, hard drives, video cards, sound cards, and DVD or CD-ROMs. These components are often purchased from different suppliers and supply facilities. Accordingly, each supplier or supply facility may establish different packaging and shipping procedures to protect the components from damage during shipping. Unfortunately, this may lead to difficulties and inefficiencies when allocating space for these packages in warehouses and manufacturing areas. Also, time and resources are consumed in properly discarding the packaging.

In addition to the potential for components to be physically damaged during shipment, components may be damaged by electrostatic discharge (ESD). One conventional method of protecting components against ESD includes packaging components using cardboard boxes and Electron Magnetic Interference (EMI) or electrostatic discharge (ESD) metallic plastic bags. However, this creates a significant amount of waste and takes additional time both to package the components within the bags and to remove the components from the bags and to recycle or discard the bags, adding cost to a manufacturing operation.

Efforts have also been directed at using reusable packaging to avoid such waste, however, the logistics of how reusable packages are moved through a supply chain are complex. In addition, the opening of containers inside of a manufacturing facility may provide opportunities for damage of the container contents due to electrostatic discharge. Returning reusable containers may introduce additional costs to a manufacturing operation, taking significant time and resources to return the reusable container back to a supplier.

SUMMARY

Therefore a need has arisen for a system and method for managing manufacturing inventory that facilitates the efficient and uniform removal of contents from a reusable container.

A further need has arisen for a system and method for managing manufacturing inventory that facilitates the return of a reusable container after it has been emptied of its contents.

A further need has arisen for a system and method for transporting and handling manufacturing inventory using reusable containers that protects the manufacturing inventory from electrostatic discharge without the use of ESD bags.

A further need has arisen for containers having standard dimensions and features along with a method to distinguish and properly distribute the standard containers according to the different dividers contained within the containers without having to open the containers.

In accordance with teachings of the present disclosure, a system and method are described for managing manufacturing inventory that reduces the problems associated with prior systems and methods for managing manufacturing inventory.

The present disclosure includes an inventory management system using multiple reusable containers. The reusable containers are box structures having four sides, a bottom, a divider and a lid. Each reusable container also includes at least two identifiers. The first identifier indicates an associated materials storage facility; the second identifier indicates an associated supplier. In one particular embodiment, the reusable container includes a third identifier that indicates an associated divider type. More particularly, the first identifier, the second identifier, and the third identifier facilitate a two stage return process after a reusable container has been emptied of its contents. First, the reusable container is sorted according to the first identifier and returned to the materials storage facility. Second the reusable container is sorted according to the second and third identifiers and returned to its associated supply facility.

Further, the reusable container may be formed from a conductive or static dissipative material to protect its contents from electrostatic discharge. The reusable container may also include a removable divider for separating components stored within the reusable container constructed of a conductive or static dissipative material. The reusable container may also include a removable shield for protecting the components from electrostatic discharge while the container is open inside of a manufacturing facility.

The present disclosure also includes a method for managing reusable containers. The method includes sorting a reusable container according to a first identifier associated with a materials storage facility and returning the sorted reusable container to the materials storage facility. After transport to the materials storage facility, the reusable container is sorted according to a second identifier that identifies a supply facility. The reusable container may then be sorted according to a third identifier that identifies an associated divider enclosed in the container. After this sorting step, reusable container is returned to the supply facility to be refilled.

More particularly this method may include refilling the reusable container at the supply facility, transporting the filled reusable container to the associated materials storage facility, and then providing the reusable container to a manufacturing facility in response to an inventory request. The inventory request may be a short-term inventory request for an inventory period of approximately two hours.

The present disclosure also includes a method for handling reusable containers and materials inside the manufacturing facility, which includes how to handle ESD sensitive parts that are no longer protected with ESD bags.

The present disclosure includes a number of technical advantages. One important technical advantage is providing a plurality of reusable containers. This allows for greater standardization of loading and unloading of the components within the reusable containers, as well as shipping, storing and distributing the containers themselves, leading to increased efficiency, productivity, and predictability.

Another important advantage of the present invention is providing first identifiers association with materials handling facilities and second identifiers associated with suppliers and third identifier associated with divider type. This facilitates a two-stage return process, allowing the reusable containers to be efficiently returned for refilling.

Yet another important technical advantage of the present invention is providing a conductive or static dissipative reusable container and divider. This eliminates the need for metallic plastic bags to protect the contents of the reusable packages from electrostatic discharge.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 5, wherein like numbers are used to indicate like and corresponding parts.

Figures 1, 2:
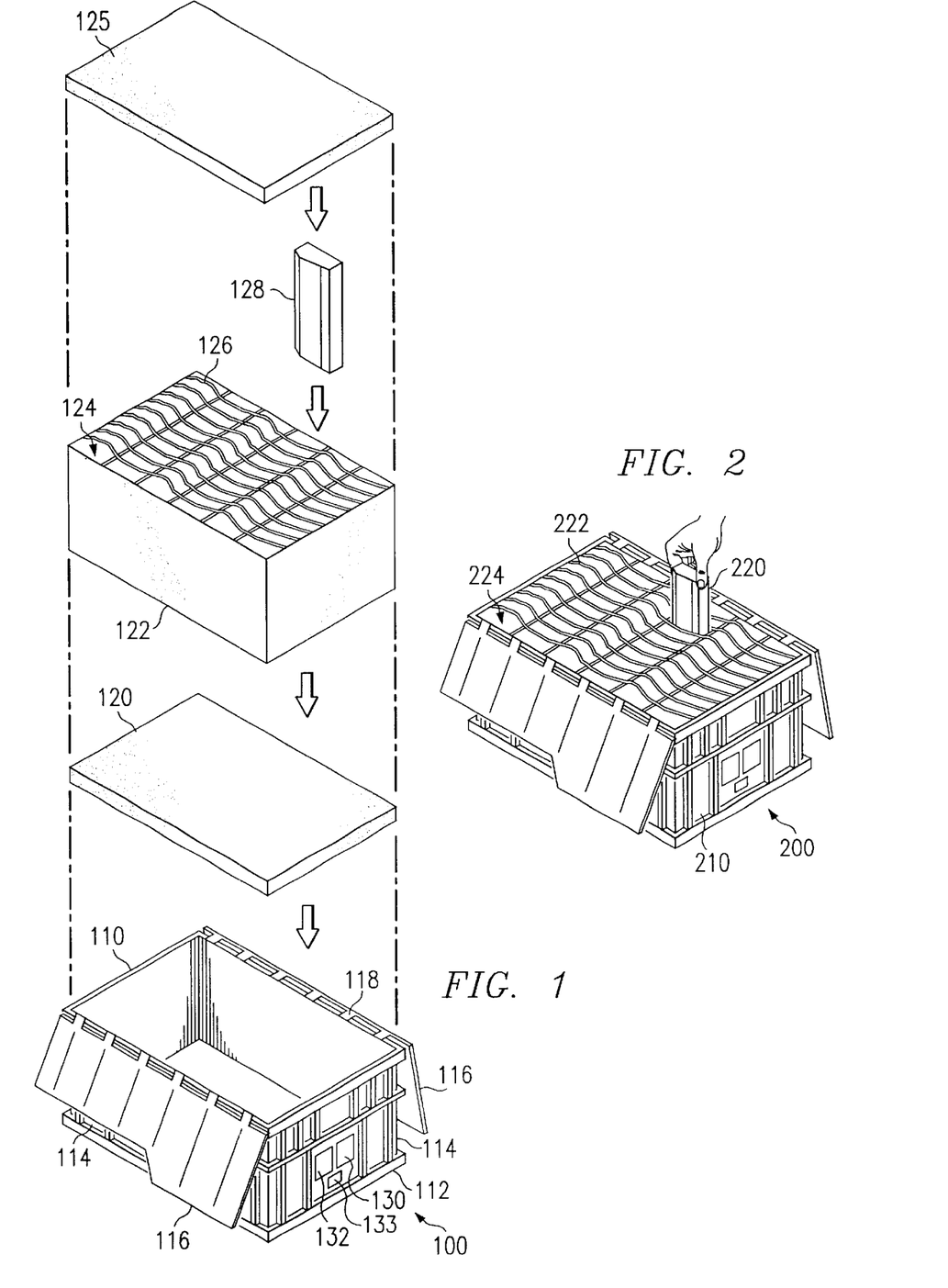
FIG. 1 is an expanded view of a reusable container assembly according to the present disclosure.
FIG. 2 is a perspective view of a reusable container with a stored component being removed.

FIG. 1 is an exploded view of a reusable container assembly indicated generally at 100. Reusable container assembly 100 includes reusable container 100, pad 120 and divider 122.

In this embodiment, reusable container 110 includes a box structure having bottom 112 sides 114 and lid assembly 116. Lid assembly 116 is hingedly connected to sides 114 at hinge 18. Accordingly lid assembly 116 may be selectively opened and closed. In an Alternative embodiment reusable container 110 may include a box structure with out a lid assembly or another suitable container geometry. Reusable container 110 also includes first identifier 130, second identifier 132, and third identifier 133 affixed to the exterior surface of side 114. First identifier 130 is preferably an adhesive identifier affixed to the side of reusable container 110. Second identifier 132 and third identifier 133 are preferably adhesive labels affixed to reusable container 110. In an alternative embodiment first identifier 130, second identifier 132, and third identifier 133 may be combined into a single adhesive label containing three separate identifiers. First identifier 130, second identifier 132, and third identifier 133 may be a color, text, a bar code, a symbol, or any other suitable identifier for associating reusable container 110 with a materials storage facility, a supply facility, and a divider type as described in FIGS. 4 and 5.

Reusable container 110 is preferably constructed from a carbon impregnated plastic material. This material acts to protect the contents of the interior of reusable container 110 from damage due to electrostatic discharge. Alternatively reusable container 110 may be constructed from another material suitable to protect the contents of reusable container 110 from electrostatic discharge.

Pad 120 is formed to fit within the bottom of reusable container 110. Pad 120 has a thickness operable to cushion the materials stored within reusable container 110 during transport. Divider 122 is formed and sized to fit within reusable container 110 and is preferably loaded into reusable container 110 on top of pad 120. Accordingly, pad 120 is preferably disposed between divider 122 and bottom 112 of reusable container 110. In an alternative embodiment, pad 120 may be coupled to or incorporated into divider 122.

Shield 121 is formed to fit above the divider 122 and below the lid 116 when closed. Shield 120A may be constructed from a cardboard material coated with a conductive coating or from another material suitable to protect the contents of reusable container 110 from electrostatic discharge when lid assembly 166 is open. Shield 121 may be formed from a conductive or static dissapative material for this purpose. Shield 121 provides ESD protection once lid 116 is opened in a non-ESD protected environment and until it can be handled by an ESD protected individual. Shield 120a is preferably disposed above divider 122 and below lid assembly 116 when closed.

Divider 122 preferably forms a plurality of slots 124. Divider 122 may also be referred to as an insert or a divider insert. Slots 124 are sized to store components 128. Components 128 may include motherboards, processors, hard drives, video cards, sound cards, DVDs, CD-ROMs or other component devices. Accordingly, the size of components 128 vary for each component and the size of slots 124 will vary according to the size of component 128 it is designed to store. Preferably, slots 124 are formed to hold a plurality of a particular type of component 128 such that density of components 128 is maximized while still properly storing and protecting components 128.

Slots 124 preferably form an opening accessible when lid assembly 116 is in an open position. This allows access to the components 128 stored within reusable container 110. Slots 124 may preferably include finger tabs 126. Finger tabs 126 may include an indentation, notch, or other suitable guide mechanism to aid in the unloading and loading of components 128 into reusable carton 110 with divider 122. Finger tabs 126 act to direct materials handlers to grasp a desired portion of component 128. This provides an advantage as it keeps materials handlers from incorrectly grasping sensitive portions of component 128 and possibly damaging component 128 or injuring themselves on sharp or jagged portions extending from component 128.

Divider 122 may have a number of embodiments, resulting from the construction of dividers 122 to store components 128 having different geometries. For example, divider 122 constructed for housing motherboard components will generally provide larger slots 124 than dividers formed to store a plurality of sound card components. Divider 122 is preferably easily removable from reusable container 110 such that if divider 122 becomes damaged or if a different sized component is to be stored within reusable container 110, divider 122 may be removed and replaced with another divider 122 that is either undamaged or sized appropriately for a particular component 124.

Divider 122 may preferably be constructed from a cardboard material. Preferably the cardboard material may be coated with a conductive coating for preventing electrostatic discharge. Divider 122 may be constructed from another material such as a conductive material or a static dissapative material for preventing electrostatic discharge and protect the contents of reusable container 110 from electrostatic discharge.

Reusable container 110 may further include additional identifiers affixed to the exterior surface. Additional identifiers may include information about a particular shipment including shipment tracking data and component identification data. Additional identifiers may include bar codes or text describing the desired shipping information.

The exterior dimensions of reusable container 110 are preferably selected to maximize the density of containers stored within transport vehicle. The exterior dimensions of reusable container 110 may also be selected to facilitate loading reusable containers 110 into racks, sometimes referred to as "pick to light" racks, for materials handlers to remove components 128 from reusable containers 110. In a preferred embodiment, reusable containers 110 may be provided in two or more standard sizes. A smaller reusable container 110 may be used to hold smaller components 128 such as sound cards while a larger reusable container may be used to hold larger components 128 such as motherboards. In a particular embodiment reusable containers 128 may be provided having standard dimensions of either approximately 16×24×9 inches or 16×24×11 inches.

FIG. 2 is a perspective view of a reusable container with a stored component being removed. Reusable container assembly 200 includes reusable container 210 having a divider 222 disposed therein. Component 228 is shown being removed from insert slots 224.

Figure 3:
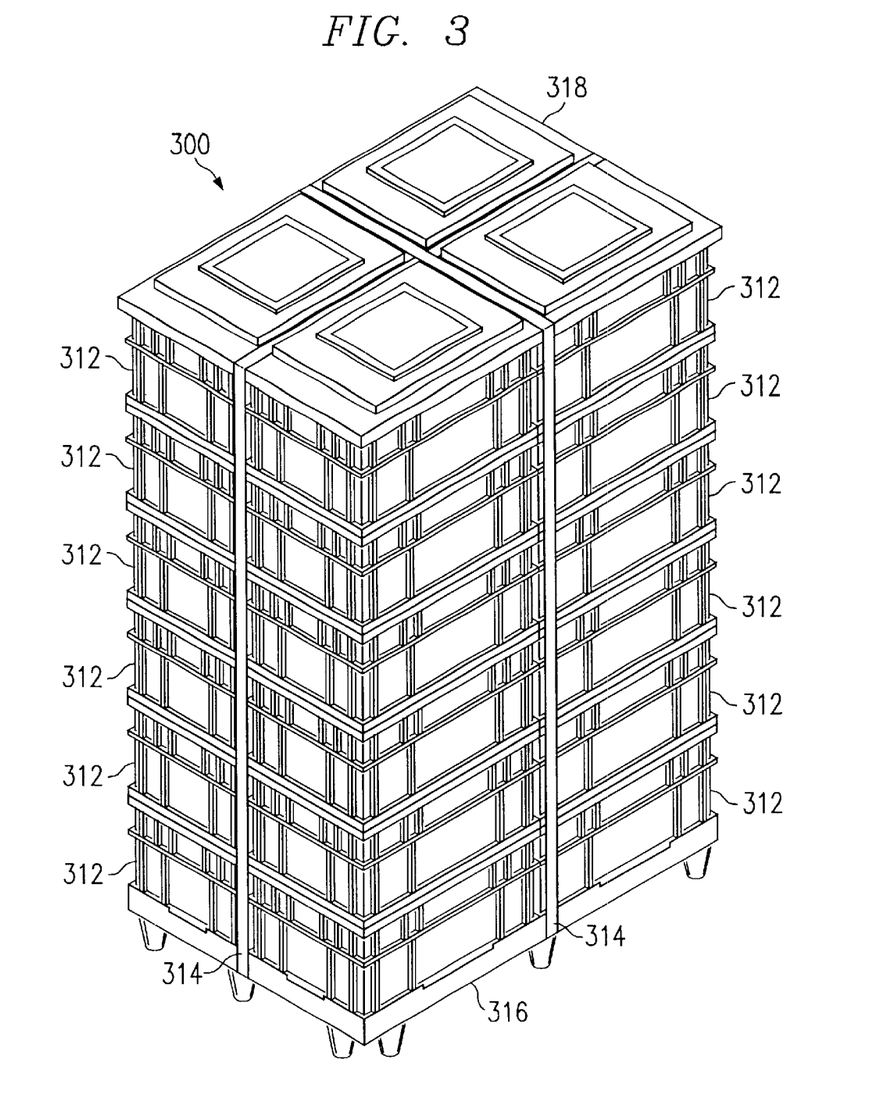
FIG. 3 is a perspective view of a plurality of reusable containers assembled for shipment.

FIG. 3 is a perspective view of a plurality of reusable containers assembled for shipment depicted generally at 300. Reusable containers 312 are shown stacked on pallet bottom 316. The present embodiment shows groupings of four reusable containers stacked six containers high and secured by pallet top 318. Pallet top 318 and pallet bottom 316 are further secured by binders 314. In an alternative embodiment either more or fewer reusable containers 312 may be assembled depending upon their geometries. The assembled containers 300 may then be moved with a fork lift, pallet jack, or other suitable device for shipping or storage. Containers 312 may be assembled 300 for shipping either for the delivery of components or for the return of empty reusable containers 310. Empty containers that have been sorted according to the second and third identifiers (as shown in FIG. 1) are assembled together on a pallet. This simplifies both the return of these containers to the supply facility and the subsequent handling of these containers inside the supply facility. Additionally, in the present embodiment reusable containers 312 have a non-nesting configuration. In an alternative embodiment, containers 312 may have a configuration suitable for nesting.

Figure 4:
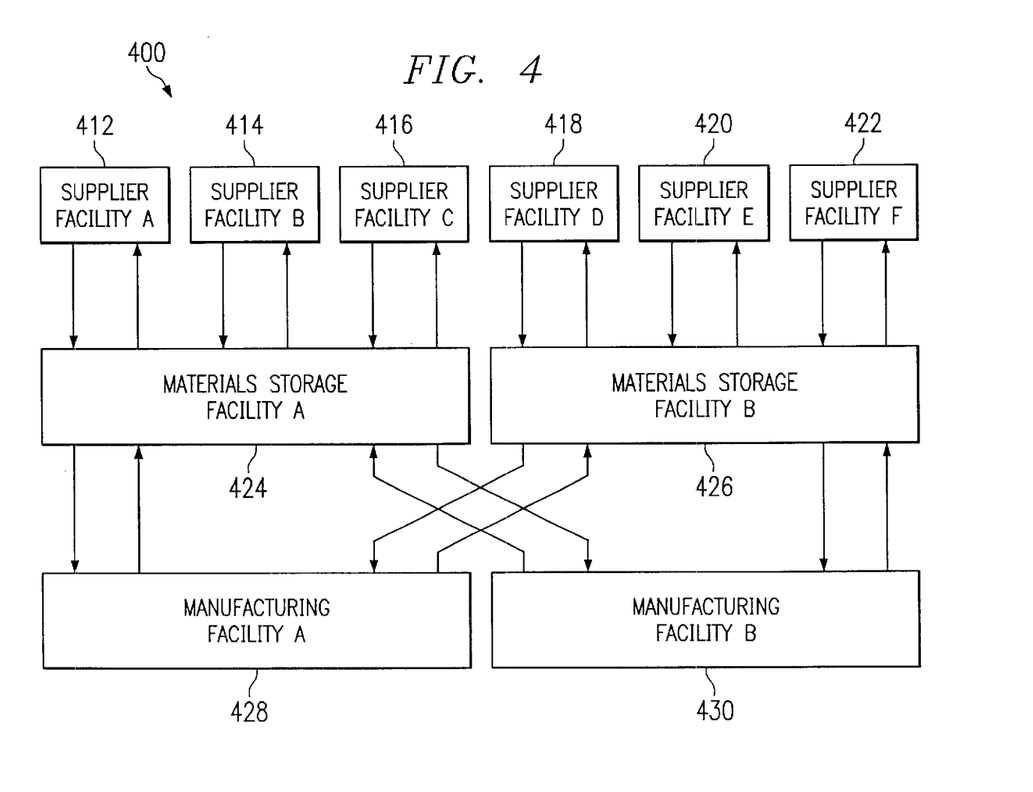
FIG. 4 is a diagram showing the flow of reusable containers in a system of using reusable containers including supply facilities, materials storage facilities, and manufacturing facilities.

FIG. 4 depicts a diagram showing the flow of reusable containers and a system for using reusable containers depicted generally at 400. The system for using reusable containers 400 includes supplier facility A 412, supplier facility B 414, and supplier facility C 416. Supplier facility A 412, supplier facility B 414 and supplier facility C 416 each provide materials to materials storage facility A 424 in reusable containers (as shown in FIGS. 1–3). Each supplier may provide one or more components for manufacturing facility A 428 or manufacturing facility B 430. Supplier facility A 412, supplier facility B 414, supplier facility C 416 supply materials to and receive empty reusable containers from materials storage facility A 424. Supplier facility D 418, supplier facility E 420 and supplier facility F 422 provide manufacturing inventory to materials storage facility B 426. Materials storage facility B 426 also provides empty reusable containers to supplier facility D 418, supplier facility E 420 and supplier facility F 422.

Materials storage facility A 424 may supply manufacturing inventory to manufacturing facility A 428 and manufacturing facility B 430. Materials storage facility B 426 may provide manufacturing inventory in reusable containers to manufacturing facility A 428 and manufacturing facility B 430. Manufacturing facility A 428 may also provide empty reusable containers to materials storage facility A 424 and materials storage facility B 426. Also, manufacturing facility B 430 may provide empty reusable containers to materials storage facility A 424 and materials storage facility B 426.

Materials storage facility A 424 and B 426 may be operated either by an entity associated with a supplier, a manufacturing facility or by a separate third party. Materials storage facility A 424 or B 426 may also be referred to as a revolver or a supplier logistics center (SLC).

In operation, reusable container (as shown in FIGS. 1, 2 and 3) are initially received and filled at a supplier facility, such as supplier facility A 412. At least two identifiers (as shown in FIG. 1) are affixed to each reusable container, indicating the supplier and the materials storage facility associated with it. In the present embodiment, materials storage facility A 424 is associated with supplier A 412. After being filled with appropriate components at supplier A, further information such as shipping information and information about the contents of the reusable container may be affixed to the reusable container. Additionally, a security seal may be affixed to the lid assembly (as shown in FIG. 1) to ensure that the reusable container is not opened during transport. The reusable container may then be assembled with a plurality of other reusable containers (as shown in FIG. 3) for transport to materials storage facility A 424.

Data may then be taken from the exterior shipping information to track or monitor the manufacturing inventory that is exiting supplier A 412. This data may also be taken before the reusable containers are assembled into a pallet. This data may be sent to materials storage facility A 424 and manufacturing facilities 428 and 430. The assembled reusable packages are then preferably transported to materials storage facility A and received.

When the assembled reusable packages are received, the contents and the shipment can be verified from the shipping data on the exterior of the reusable containers. This verification may include entering the shipping data via bar codes. This data may then be sent to manufacturing facilities A 428 and B 430.

Materials storage facility A 424 may then store the received reusable containers. Materials storage facility may then receive a materials request from a manufacturing facility such as manufacturing facility A 424. In response to the materials request, manufacturing facility A then gathers or "picks" the requested components, stored in the reusable package. The reusable packages may be gathered as an assembled pallet or individually, depending on the type of component requested and the available inventory.

The gathered reusable packages may then be verified using the affixed shipping label. This verification information may then be used to update the available inventory information within materials storage facility A 424. The gathered reusable containers may then be delivered to manufacturing facility A 428.

In a particular embodiment, the materials request received by materials storage facility A 424 is a request for manufacturing inventory needed for a relatively short manufacturing cycle. In one embodiment the request may be for a manufacturing cycle of less than three hours. In another the request may be for inventory for a manufacturing cycle of approximately two hours.

The delivered reusable containers may next be received at manufacturing facility A 428. This may include using bar code scanners to identify the contents of the reusable containers using the shipping labels affixed to the reusable containers. Also at this time, the reusable containers may be inspected to insure that the security seals are properly affixed to the reusable packages. Once the reusable containers have been inspected, a materials handler may remove tamper seals, fold down the lid assembly, ensure that the electrostatic shield is in place, and load the reusable container onto racks such as "pick to light" rack. ESD protected materials handlers such as ESD protected kitting operators may then remove the electrostatic shield before removing components from the reusable containers. After the reusable containers are emptied of their contents, the ESD shields are preferably replaced, the lids are closed, and the emptied reusable containers may be stored in an area dedicated to emptied reusable containers.

The emptied reusable containers may then be sorted according to the first identifier affixed to each reusable container. The first identifier indicates which materials storage facility the reusable container is associated with. Also at this time, the shipping information affixed to the reusable containers may preferably be removed. The first identifier, second identifier, and third identifier are left on the reusable containers.

The sorted reusable containers are preferably grouped according to their associated materials storage facility. In this particular embodiment reusable containers may be associated with either materials storage facility A 424 or materials storage facility B 426. After this sorting step, reusable containers are returned to their associated materials storage facility. For example, a reusable container with a first identifier indicating it is associated with materials storage facility A 424 will be grouped with other reusable containers associated with materials storage facility A 424 and returned there. Preferably, the sorted and grouped reusable containers will be returned to the materials storage facility to which it is associated on a truck that has recently delivered manufacturing inventory from the associated materials storage facility and is returning to that materials storage facility. This provides the benefit of returning the reusable container as part of a regular inventory delivery process and not requiring that a separate delivery of reusable containers be made.

The reusable containers may then be received at materials storage facility A 424. The reusable containers are then sorted and grouped according to their second identifier that indicates an associated supplier facility such as supplier facilities A 412, B 414, or C 416 (as shown in FIG. 4). The reusable containers are then sorted according to their third identifier that indicates the type of divider enclosed within the container. The sorted reusable containers may then be prepared for shipping (as shown in FIG. 3) and returned to their associated supplier. Alternatively, the sorted reusable containers may be nested for shipment or may be returned in an unassembled fashion. Once delivered to their associated supplier the reusable container may be refilled and used again.

Alternatively, the reusable containers sorted at the materials storage facility may instead be returned to an intermediate or holding facility associated with the associated supply facility. This allows a supply facility to regulate the supply of reusable containers available and control the number of empty reusable containers physically located at the supply facility, facilitating the management of space within the supply facility.

Figure 5:
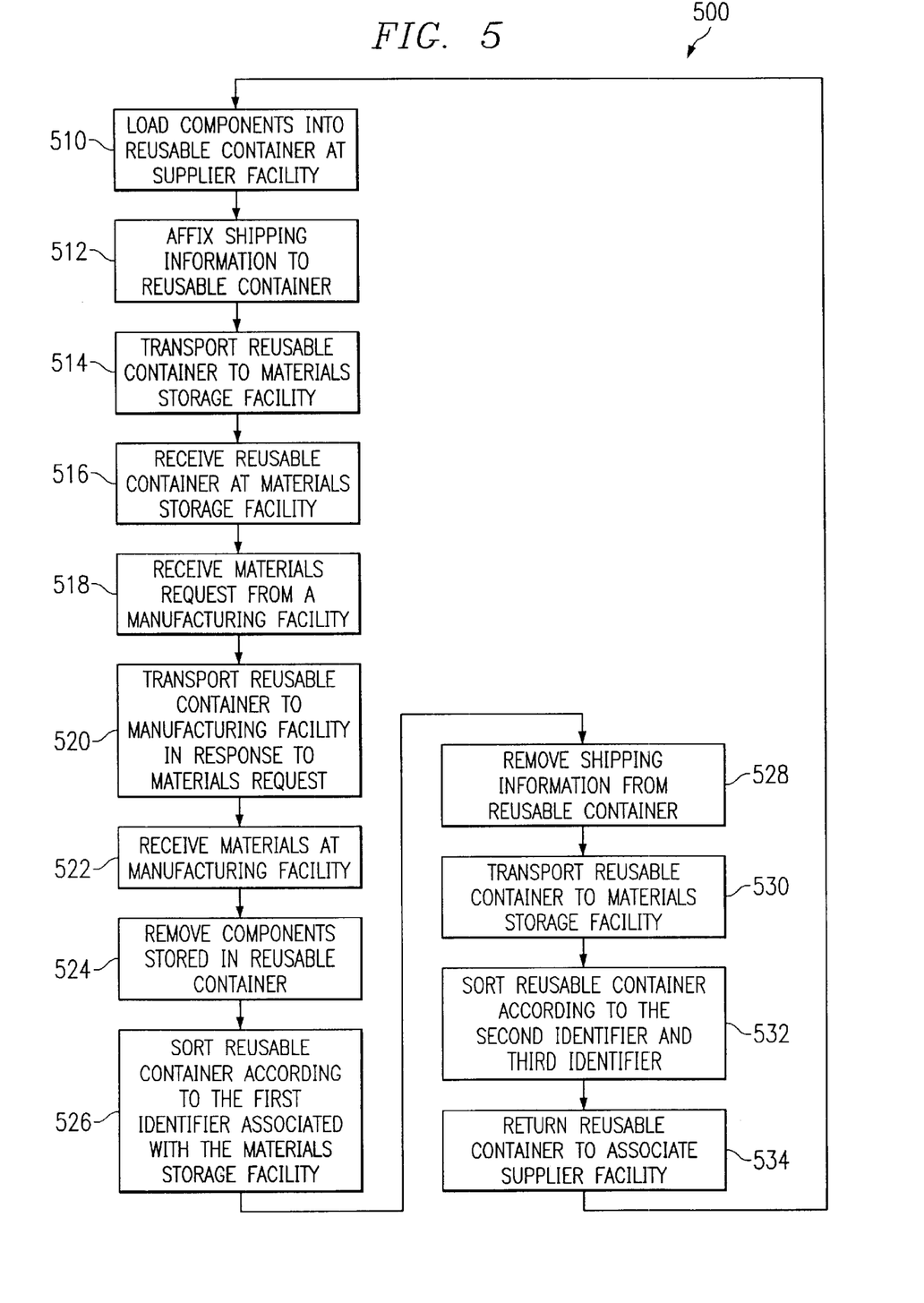
FIG. 5 is a flow diagram according to the present disclosure.

FIG. 5 is a flow diagram according to the present disclosure showing the flow of reusable containers in an inventory management system, indicated generally at 500. As an initial step 510, components are loaded into a reusable container (as shown in FIG. 1) at a supply facility (as shown in FIG. 4). As indicated in FIG. 1, the reusable container also includes a first identifier and a second identifier. Next, shipping information is preferably affixed to the reusable container 512. This may include information about the contents, destination, or purchase order associated with the shipment. This information may be included in a bar code format. The reusable containers may then be transported to an associated materials storage facility (as shown in FIG. 4) 514.

The reusable containers may then be received at the materials storage facility 516, which also receives material requests from a manufacturing facility (as shown in FIG. 4). This may sometimes be referred to as an inbound materials requests or a manufacturing inventory request. In one embodiment, the materials storage facility receives short-term materials requests from the manufacturing facility in regular, preset increments. These requests may arrive every few hours. In one embodiment, materials requests are received by the materials storage facility approximately in two hour increments. The short-term materials request may include a request for the materials needed for a relatively short manufacturing cycle, such as a multiple hour period. Accordingly, materials are also provided from the materials storage facility at similar regular increments.

The reusable containers may then be transported to the manufacturing facility 520 and received 522. The components stored within the reusable containers may then be removed 524 for use at the manufacturing facility.

After being emptied, the reusable containers are preferably sorted according to the first identifier 526. The shipping labels may then be removed 528 and the reusable containers returned to the materials storage facility 530. At the materials storage facility, the reusable containers are sorted again according to the second and third identifiers 532. Alternatively, all sorting steps may take place at the manufacturing facility. Finally, the reusable container may be returned to its associated supply facility 534 and loaded with components 510.

Although the disclosed embodiments have been described in detail, it should be understood that various changes, substitutions and alterations can be made to the embodiments without departing from their spirit and scope.

What is claimed is:

1. A method for managing a plurality of reusable containers for storing manufacturing inventor, the method comprising:

sorting the plurality of reusable containers according to a first identifier affixed to each reusable container, the first identifier identifying an associated materials storage facility;

returning the plurality of sorted reusable containers to the materials storage facility associated with each reusable container;

sorting the plurality of reusable containers according to a second identifier affixed to each reusable container, the second identifier associated with a supply facility;

sorting the plurality of reusable containers according to a third identifier affixed to each reusable container, the third identifier associated with the divider type enclosed within the reusable containers; and returning the plurality of reusable containers to the supply facility associated with each reusable container.

2. The method of claim 1 further comprising:

sorting the plurality of reusable containers according to the first identifier at a manufacturing facility;

sorting the plurality of reusable containers according to the second identifier at a materials storage facility; and sorting the plurality of reusable containers according to the third identifier at the materials storage facility.

3. The method of claim 1 wherein sorting the plurality of reusable container according to a first identifier further comprises sorting the plurality of reusable containers according to a symbol identifier.

4. The method of claim 1 wherein sorting the plurality of reusable container according to a second identifier further comprises sorting the plurality of reusable containers according to a color and text identifier.

5. The method of claim 1 wherein sorting the plurality of reusable container according to the third identifier further comprises sorting the plurality of reusable containers according to a number identifier.

6. A method for managing reusable containers for storing manufacturing inventory comprising:

providing a reusable container for storing manufacturing inventory to a materials storage facility;

providing the reusable container to a manufacturing facility in response to an inventory request;

emptying the reusable container in fulfillment of a manufacturing order;

sorting the reusable container according to a first identifier associated with the materials storage facility;

returning the sorted reusable container to the materials storage facility;

sorting the reusable container according to a second identifier associated with a supply facility;

sorting the reusable container according to a third identifier associated with a style of divider enclosed within the reusable container; and returning the emptied reusable container to the supply facility.

7. The method of claim 6 further comprising providing the reusable container to the manufacturing facility in response to an inventory request for an inventory period less than three hours.

8. The method of claim 6 further comprising providing the reusable container to the manufacturing facility in response to an inventory request for an inventory period of approximately two hours.

* * * * *